Aug. 20, 1946.  J. HEUSCHKEL  2,406,076
APPARATUS FOR DETERMINING WELDABILITY
Filed June 9, 1943  5 Sheets—Sheet 1

INVENTOR
JULIUS HEUSCHKEL,
by: John E Jackson
his Attorney.

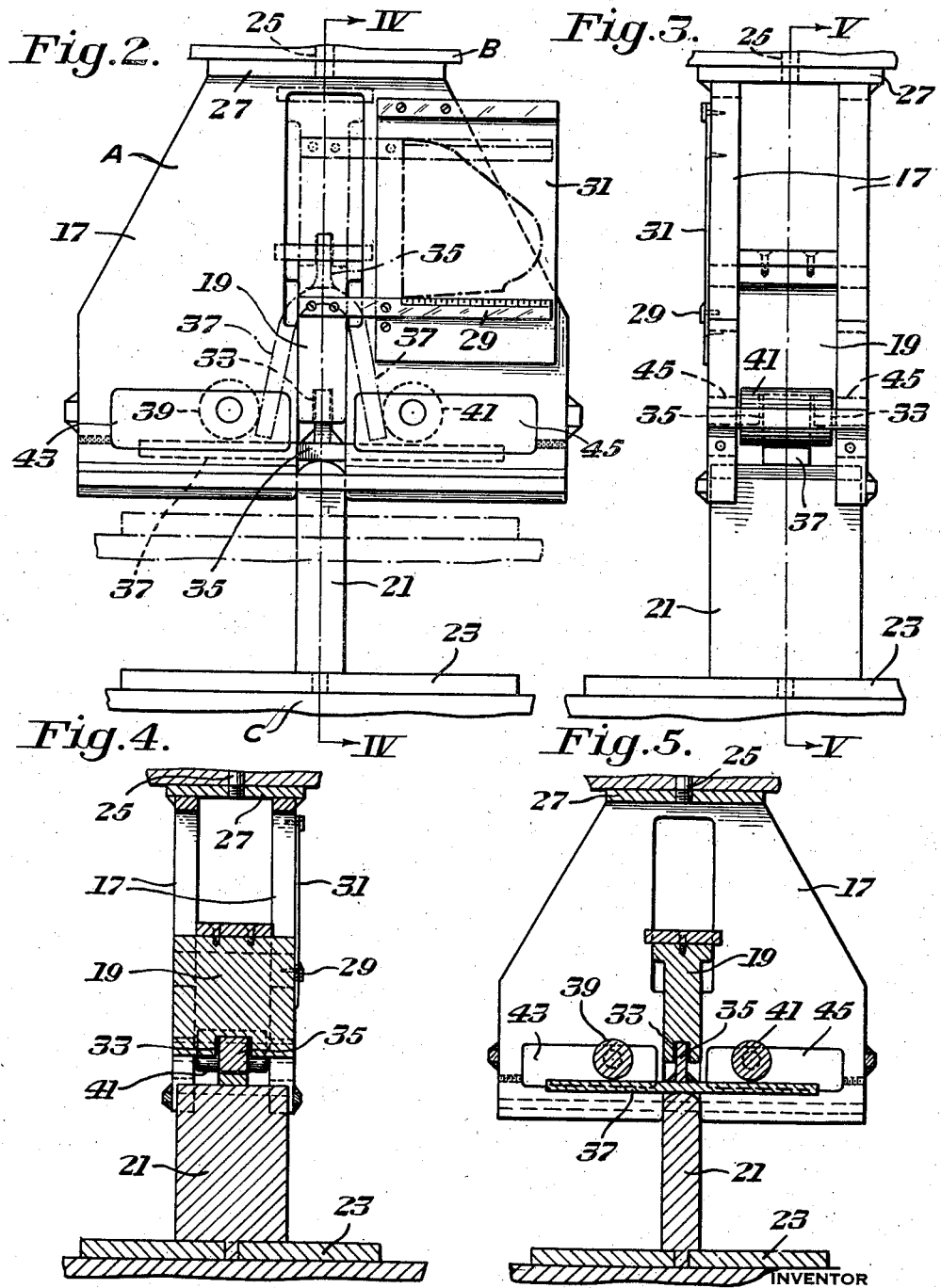

Aug. 20, 1946.  J. HEUSCHKEL  2,406,076
APPARATUS FOR DETERMINING WELDABILITY
Filed June 9, 1943  5 Sheets-Sheet 3
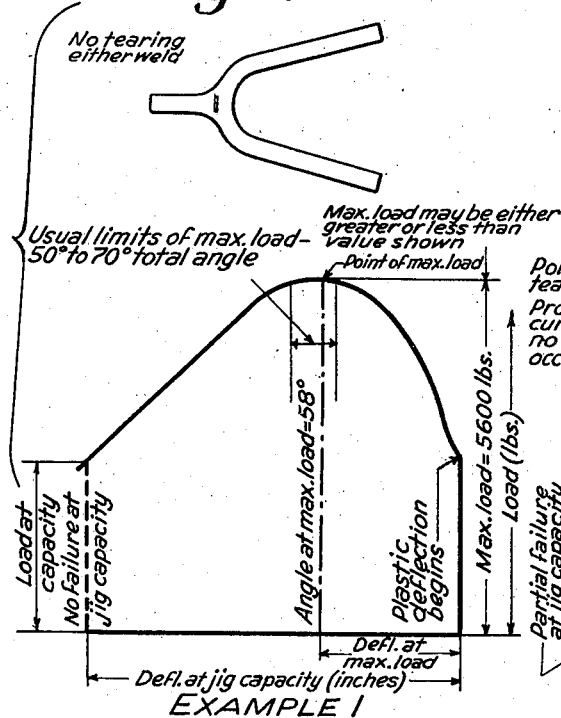
Fig. 6. EXAMPLE 1
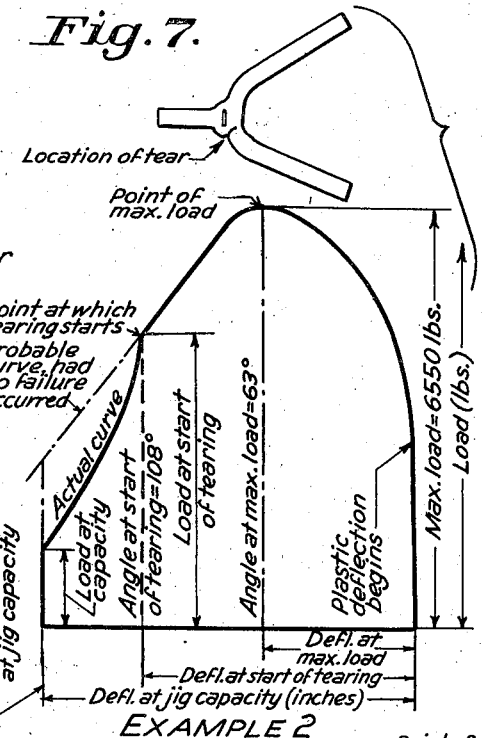
Fig. 7. EXAMPLE 2
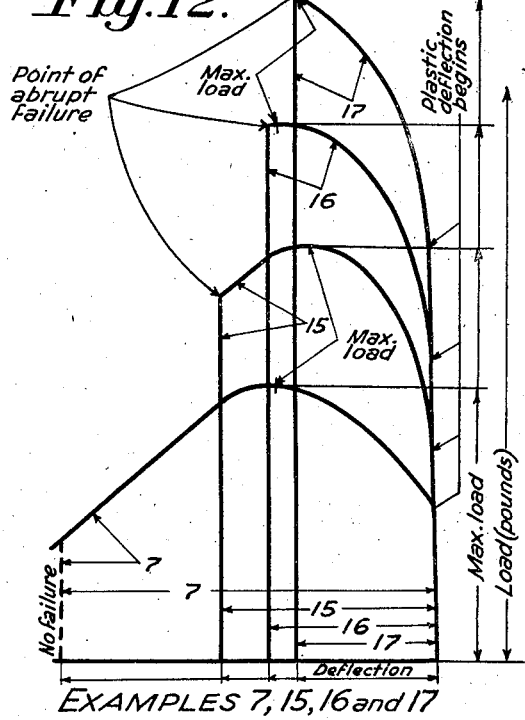
Fig. 12. EXAMPLES 7, 15, 16 and 17
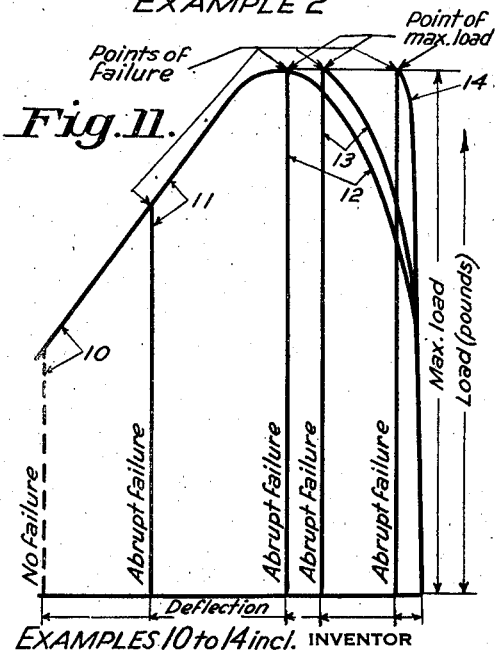
Fig. 11. EXAMPLES 10 to 14 incl.
INVENTOR
JULIUS HEUSCHKEL,
by: John E. Jackson
his Attorney.

Aug. 20, 1946.   J. HEUSCHKEL   2,406,076
APPARATUS FOR DETERMINING WELDABILITY
Filed June 9, 1943   5 Sheets-Sheet 4

EXAMPLE 3

INVENTOR
JULIUS HEUSCHKEL,
by: John E. Jackson
his Attorney.

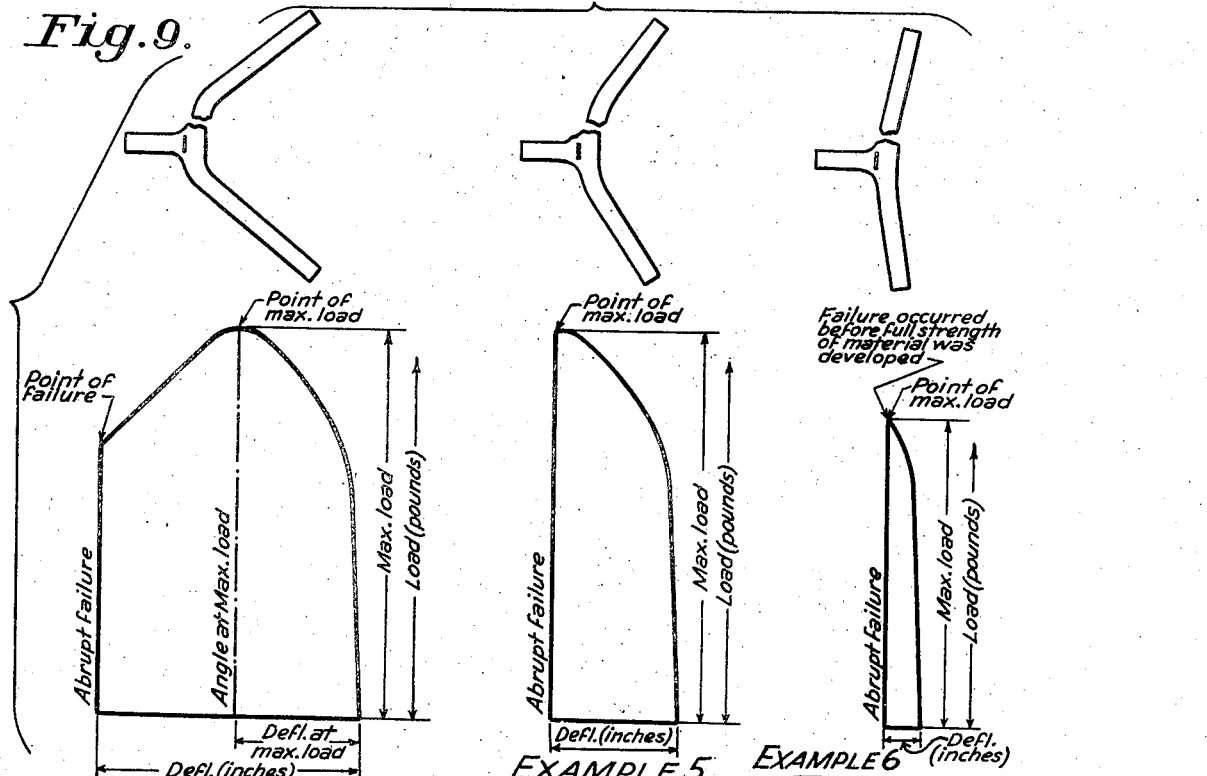
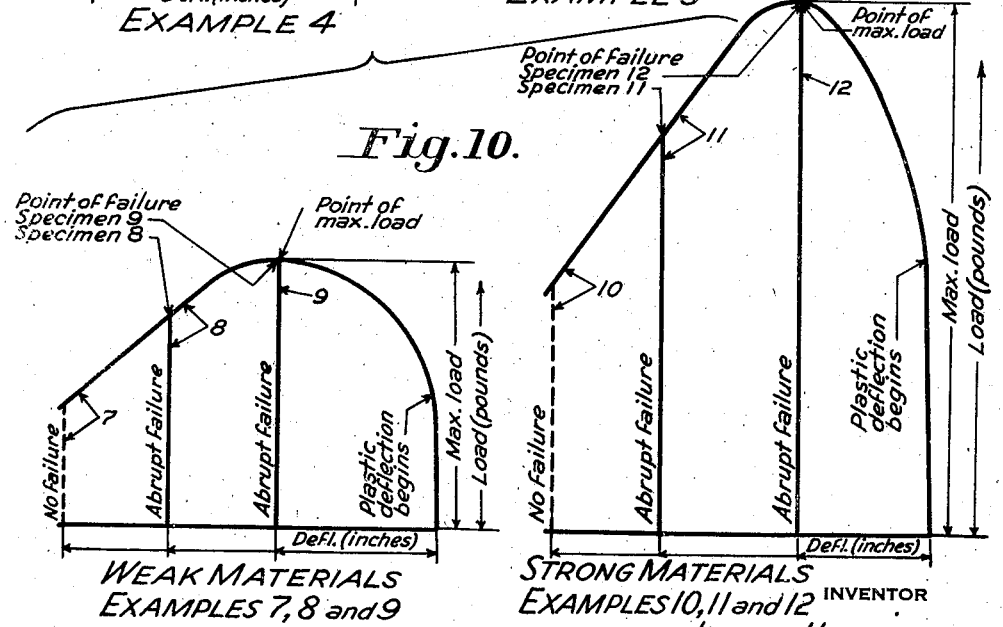

Patented Aug. 20, 1946

2,406,076

UNITED STATES PATENT OFFICE 2,406,076

APPARATUS FOR DETERMINING WELDABILITY

Julius Heuschkel, Mount Lebanon, Pa., assignor to Carnegie-Illinois Steel Corporation, a corporation of New Jersey Application June 9, 1943, Serial No. 490,212

2 Claims. (Cl. 73—89)

The present invention provides certain improvements in apparatus for determining the weldability of steels, the invention enabling a more accurate determination of this property than has been possible by procedures heretofore customarily employed and considered to be standard. Generally speaking, the present invention provides a low speed energy absorption operation, and particularly with the necessary apparatus, by means of which it is possible to compare the probable service performance of metals when fusion-welded. The development and selection of a method or weldability test for determining the relative suitability of various materials for use in any particular welded application has been widely discussed but not one universally accepted test has been or is now being used by either the welding or manufacturing industries.

The present invention utilizes the so-called "T-bend" test which was developed by the United States Navy Department.

In this T-bend test a T-shaped specimen is formed by welding together two elements of standardized cross-section. The test specimen is placed in position with respect to a centrally disposed mandrel which is attached to the platen of a compression type test machine. The stem of the T is held firmly in the slot of a vertically movable guide. The welded surface of the T-cross bar is placed horizontally in contact with a pair of rollers, one on each side of the vertical stem. A load is applied to the specimen opposite from the welded side by movement of the platen. Movement of the T-cross bar is resisted by the rollers, resulting in the cross bar being deflected at an angle which is related to the value of the load applied. The stress developed by the load strains the specimen severely in the heat-affected zone of the welded joint and the angular deflection which the joint can sustain is commonly used as an indication of the weldabiilty of the base material.

As originally devised and generally used, the above described "T-bend" test has one serious weakness: namely, the inability to define logically just what constitutes acceptable performance. Further, except for special applications, it has been difficult to explain why any particular arbitrary standard of load resisted, or deformation sustained, or type of fracture, must be met. If such a welded bend specimen breaks sharply, there is no question about the time of failure, since the angle of failure can be readily determined. If, however, progressive tearing back along the bend or into the base metal takes place, it is difficult to determine at what angle the tearing starts and to state whether that angle or the ultimate angle of bend should be considered as the angle of failure. Quantitative answers based upon angle of bend alone therefore are questionable. Some users have recognized this difficulty in their bend testing, but rather than attempting to obtain a quantitative answer in terms of angle of bend, they have established minimum ultimate angles of bend either at maximum load or at the occurrence of failure and judged the performance of the specimen by the character of the fractures. Just what use, if any, should be made of the maximum load resulting from the test has been a matter of disagreement.

It can be seen from the foregoing that in the T-bend test as generally used, the performance of the welded joint could be judged by five criteria: (1) the maximum load applied; (2) the deformation at which maximum load occurred; (3) the deformation at the start of failure; (4) the final deformation at complete failure; and (5) by the type of fracture. Of these criteria, all but the first have been used at different times in judging the merit of a steel; the value of the maximum load has merely been recorded. The significance of both the deflection at the occurrence of the fracture and the type of fracture are often a matter for differences of opinion. Since the five factors are often independent variables, no single acceptable basis has existed for distinguishing between strong brittle steels and weak ductile steels, or for comparing strong ductile steels with weak brittle ones, or for readily comparing any of the many intermediate types.

For correcting these defficiencies, while retaining the use of the fundamentally sound features of the T-bend test, there has been developed the present invention which involves a method of determining the energy of deformation of welded joints, which method can be used as a quantitative measure of weldability of the base metal. The measurement of energy enables the relative suitability of materials for use in various applications to be determined and rated if desired.

The invention will be understood more readily from a consideration of the accompanying drawings, wherein:

Fig. 2 is an enlarged detailed front elevation of the portion of the mechanism of Fig. 1 which directly receives the test specimen and enables the energy determinations of the present invention to be made;

Fig. 3 is a side elevation of the apparatus of Fig. 2;

Fig. 4 is a sectional elevation through the device of Fig. 2, at a reduced scale, the view being taken on the section line IV—IV of Fig. 2;

Fig. 5 is a sectional elevation taken at right angles to Fig. 4, at a reduced scale, the view being taken along the line V—V of Fig. 3, looking in the direction of the arrows;

Fig. 6 is an energy diagram where no failure or break in the specimen occurred, the view showing the bend imparted to the specimen;

Fig. 7 is an energy diagram similar to Fig. 6, but obtained where a partial tear occurred in the specimen during bending, the specimen being also indicated in the view;

Fig. 9 shows three energy curves resulting from a sharp fracture, the view showing also the types of breaks in actual welded specimens corresponding to the respective curves;

Fig. 10 shows two sets of superposed energy diagrams showing actual examples of the behavior of different steels from the standpoint of energy absorption up to points of failure, the said steels resisting maximum loads and having the same deflection at maximum loads;

Fig. 11 shows superposed energy diagrams obtained from examination of four specimens of steel, showing the relation between the angle of bend at the start of failure and relative rating bend upon energy absorption;

Figure 1:
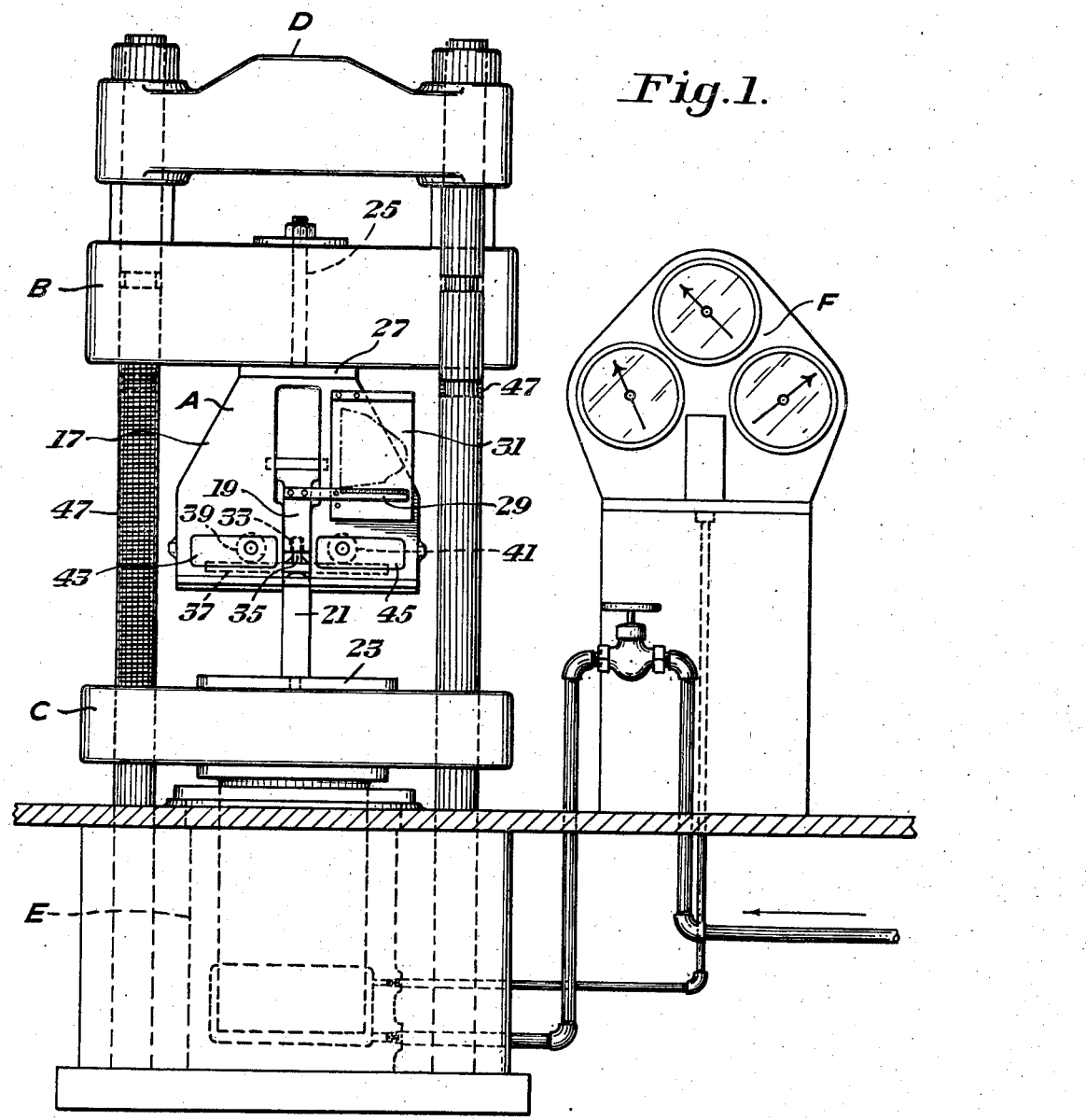
Fig. 1 represents a front elevation of an assembled equipment for making the energy determination in accordance with the present invention.
Figure 15:
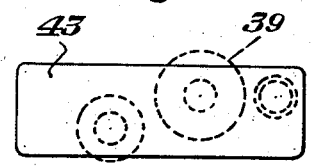
Figure 13:
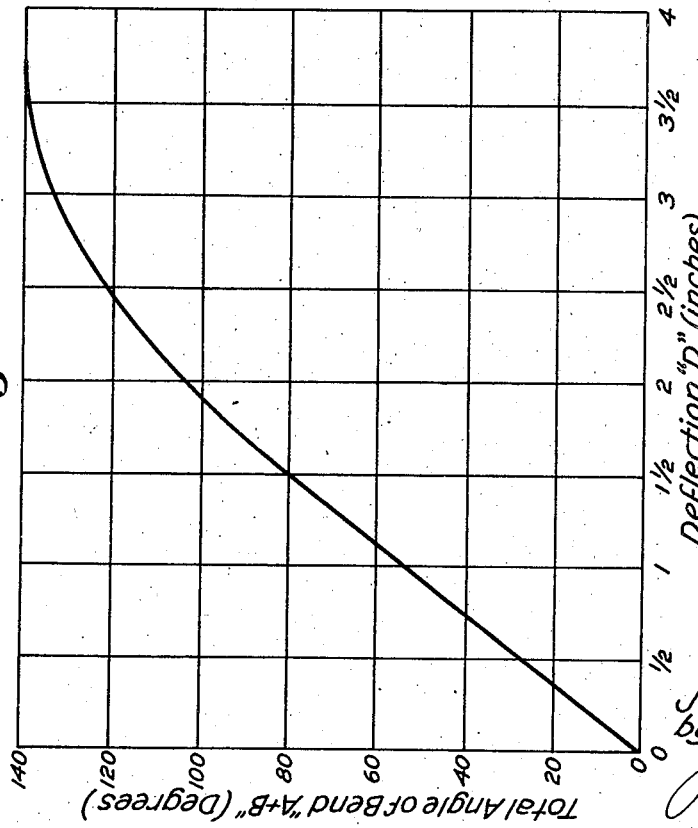
Figure 14:
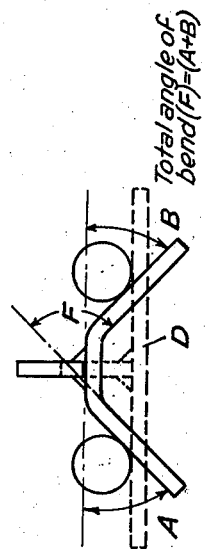

Fig. 12 also shows superposed energy diagrams showing that certain materials may have equal capacities to absorb energy while having widely different abilities to resist loads and deflection;

Fig. 13 is a graph showing a deflection-angle curve for a given thickness and span of a given test-piece;

Fig. 14 is a diagrammatic view showing the manner of determination of the total angle of bend; and Fig. 15 is a diagrammatic elevation of a roller block which is employed in the apparatus of Fig. 1, the view indicating different sizes of rollers which may be used interchangeably for obtaining predetermined conditions of bending for selected specimens.

Referring more particularly to the drawings, the apparatus for making the determinations in accordance with the present invention is indicated at A, which is mounted between the top and bottom platens B and C of the testing machine D, which is of any standard type, there being relative movement between the platens, the bottom platen C being the movable platen in the illustrated embodiment of the machine, it being the head of a hydraulic piston operating in cylinder E, the cylinder being connected hydraulically to pressure indicating gages F, which gages measure the amount of force applied to the specimen during deformation thereof.

The apparatus proper for making the determinations comprises a frame 17 in which is slidably mounted a crosshead 19 which is operated by a loading mandrel 21 which has a base 23 adapted to engage with the bottom platen C of the machine. The frame 17 is removably held between the platens B and C by means of a securing bolt or the like 25 which is passed through the head member 27 of the frame 17 and through the top platen B of the machine.

The crosshead 19 is T-shaped, and the horizontal member carries a scale 29, the scale 29 extending across a pad of chart blanks 31 suitably mounted on the upper part of the frame 17. The scale 29 is calibrated in any suitable units of length. Equal units of length along the scale 29 are selected to correspond to equal increments of load as measured by the gages F. As the load is applied, points are marked manually on the chart blanks 31 at these selected points whenever the gages F indicate changes of load corresponding to the said equal increments of load. The increments of load may be of any selected value, for example, 100 pounds, 200 pounds, 500 pounds, or 1000 pounds, depending on the accuracy desired. The stem of the T-shaped crosshead is provided with a slot 33 which receives the stem 35 of the welded together T specimen, which rests on the mandrel 21 with its crossbar 37 beneath the spaced deforming rollers 39, 41, which are mounted in suitable blocks 43, 45, which are removably secured in the frame members 17. The rollers may also be removable from their block for replacement by other rollers of selected size and shape to make the conditions of bending predeterminately conformable to any given type of specimen being examined.

In the operation of the foregoing equipment, the scale 29, which is calibrated in pounds load is mounted on the crosshead 19 and extends horizontally across the pad of chart blanks 31 which is mounted suitably on the upper frame 17 as is shown in Figs. 1 and 2. The diameters and spacings of the bending rollers 39 and 41 and the radius of the mandrel 21 may be varied at will; and the roller blocks are removable, as has been mentioned above. The specimen, which is a suitable length and width of an actual welded joint, is placed welded side up on the mandrel 21. The frame 17 is lowered by lowering the platen B through the driving screws 47 of which there are two provided on the machine for operating the platen until the stem 35 of the T-specimen enters the centering slot 33 in the crosshead 19. This slot 33 is so designed that the upper part of the stem bears against the base of the slot before the deforming rollers 39 and 41 contact the specimen. The specimen thereby becomes both centered and guided automatically. If any other type of joint is used, the specimen must be centered properly. The load is applied always exactly on the center line of the joint. This condition is assured since the mandrel 21 has a thickness which will just permit its entry between the main members of the frame 17.

To produce the bending of the specimen, hydraulic pressure is applied beneath the platen C.

As the bending load is applied, the horizontal member 37 is deflected about the mandrel 21, as is shown in Fig. 14. At suitable increments of load, for example as the increments of the load increase 100 lbs., as indicated by the dials F, the machine operator announces the load borne by the specimen and the apparatus A, and the operator of this apparatus moves a pencil point by hand along the horizontal scale 29 to a value in pounds to correspond to the announced load on the specimen. The determination is stopped at failure of the specimen, or when the desired deflection has been reached. The marks on the pad 31 when connected by a continuous curve form a semi-automatic energy diagram of the deflection of the specimen. The area under the curve is measured with a planimeter and represents the absorbed energy of distortion.

Numerous different mechanical means can be devised for making these curves automatically, but the principles would not be altered by such means. Because of the abruptness with which loads often are released during sudden failures, any delicate instruments would be short lived.

The apparatus also may be used in making low temperature tests, the specimens and mandrel being immersed in a refrigerating fluid at all times.

During the time required for determination, the platen C has lifted the mandrel and crosshead from starting position indicated in full lines in Fig. 2 to the top position indicated by broken lines this indicating the amount of the deflection of the specimen.

For all diagrams of unbroken specimens shown in the drawings (Figs. 6 to 12 inclusive) the deflective limit happens to be 2.89 inches which is the limit originally established by one user of the T-bend test for ½ inch plate. This deflection corresponds to a total angle of bend of 129° with the proportions of span used. Specimens may be pushed completely through the bending rollers if desired.

If no failure of any kind occurs, an energy diagram as shown in Example 1, Fig. 6, is obtained. This example is typical of the performance of the best welding materials, although the load during deformation may be either greater or less than shown in Example 1. If no failure occurs, the load falls off in a straight line relationship with respect to deflection after the peak has been passed. The curve of Example 1, Fig. 6 was obtained by determinations made on a low carbon steel of 30,000 p. s. i. yield point and 60,000 p. s. i. tensile, welded and tested at 70° F., this being taken as standard.

If only a partial tear occurs, the load-deflection curve will depart from the straight line shown in dot and dash, as indicated in Example 2, Fig. 7. The total angle of bend corresponding to this point of departure is obtainable from angle-deflection curves (see Fig. 13), the angle of deflection, or the angle of bend, being the common standard; thus, the maximum load the sample will resist and the angle of bend are the values upon which reliance customarily is placed. Fig. 13 is included for this reason, the view showing a set of such curves for one test condition.

Figure 8:
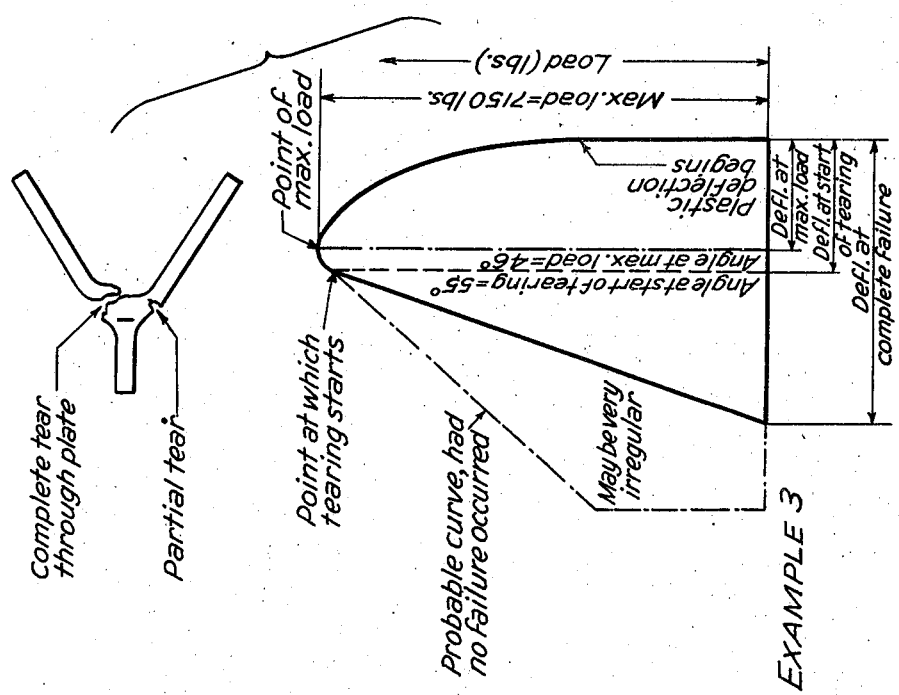
Fig. 8 is an energy diagram of the type shown in Figs. 6 and 7, but showing a complete tearing failure, the view showing also an actual weld specimen exhibiting such failure.

A complete tearing failure results in the load falling off rapidly as shown in Example 3, Fig. 8. If a sharp fracture takes place, the load immediately falls to zero as shown in Examples 4, 5 and 6, Fig. 9. The energy absorbed then depends on the deflection and load which had obtained up to the time of failure. This failure may take place after the peak load has been passed, as in Example 4, at the peak load, as in Example 5, or it may occur before reaching the normal peak load which the material would have been capable of sustaining had it had sufficient ductility after welding, as in Example 6.

The results obtained from the determinations on Examples 4, 5 and 6, are shown in the following table:

such a diagram, the following can be ascertained:
 (a) Magnitude of load at any deflection.
 (b) Deflection at any load.
 (c) Point at which non-elastic deflection begins.
 (d) Point at which maximum load occurs.
 (e) Point of occurrence of start of failure, if any, and
 (f) Character of failure, that is, whether it is gradual, abrupt, or if no failure occurred.

These points are clearly illustrated in Figs. 6 to 11, inclusive.

The maximum load borne by the specimen is shown by the maximum load ordinate and the angle at which the maximum load occurred and that at the start of failure can be obtained from the deflection at the point in question and the experimentally developed angle-deflection curves for the particular span and thickness used. An example of this is shown in Fig. 13.

Quantitative energy values for weldability obtained from the diagrams may be used in several ways. The actual inch-pounds of energy absorbed may be used as specification requirements or the ratios of the absorbed energy values of the different metals may be used to determine relative weldability.

A performance rating can be established, if desired, by comparing the ratio of the absorbed energy to the value obtained under selected test conditions for a suitable reference material. For example, a mild steel of specific tensile properties, welded and tested at 70° F., may be such a reference. The rating may be expressed in a percentage, decimal, or fractional form. The energy absorption method thus provides one single simple quantitative criterion from which all opinion has been removed. The T-bend test is sensitive to variations in welding processes, procedures and techniques, to variations in strength and cleanliness of the material, and to surface conditions and the heat treatment of the material or of the joints, and to chemistry of materials tested, but without the use of the energy diagrams to obtain a quantitative indication of the influence of these factors, the full benefit of the T-bend test is not secured. Satisfactory correlation has been established between the relative performance of steels of different compositions, properties, and thicknesses in the T-bend test with the same steels under impact loading in full-scale welded structures.

The energy method of comparison takes cognizance of the greater strength of higher tensile materials. This is very desirable because a stronger material, while possibly incapable of deflecting quite as far as a softer one, still may be sufficiently strong to absorb the energy of an applied blow or local service overload without failure, and if the stronger material is also capa-

*Table I*

| Example No. | Max. load, lbs. | Angle at max. load, deg. | Load at failure or jig capacity, lbs. | Angle at failure or jig capacity, deg. | Type of failure | Energy absorbed, inch-lbs. | Relative rating (Example 1 Fig. 6=100%) |
|---|---|---|---|---|---|---|---|
| 4 | 6,250 | 54 | 4,300 | 105 | Abrupt-complete | 10,900 | 83 |
| 5 | 6,250 | 54 | 6,250 | 54 | do | 5,400 | 41 |
| 6 | 5,000 | 16 | 5,000 | 16 | do | 1,200 | 9 |

It will be seen that the energy diagrams provide a permanent visual record of the performance of the welded specimen and that by an inspection of ble of enduring great deflection an energy absorption greater than that of a softer steel will be obtained. An illustration of this is given in Example 10, Fig. 10, the table below showing the actual data. On the other hand, with a very soft and weak but ductile material, ratios of energy absorbed less than 100 will be obtained. An illustration of this condition is shown in Example 7, Fig. 10. For very brittle materials, either strong or weak, the ratios of energy will be low, a fact, which makes the present improved method particularly useful in the designing of dynamic structures. The data for Examples 10 and 7 of Fig. 10 are shown in Table II below.

The energy diagrams provide the only known way of distinguishing between the energy required to start a crack (area in Fig. 7 under the curve up to the point at which the load first dropped an irregular amount) and the energy required to deform the specimens to failure. Comparisons for energy absorption may be established on either base, that is, at the start of crack or initial failure or at the completion of bending, i. e., at complete failure or jig capacity.

It can be seen from the superimposed actual examples in Fig. 10, that it is possible to have materials resisting the same maximum loads and having the same deflection at maximum loads and yet have quite different energy absorptions. It will be seen, therefore, that the use of the angle of bend at the time of maximum load is not a good criterion for weldability.

Table II below shows the data for these examples.

Once a material is selected as the basis for reference, the rating of any other material, on a percentage basis is obtained from the following relationship:

(1) $$R = \frac{A}{B} \times 100$$

Where

A = actual absorbed energy of specimen being tested.
B = energy absorbed by reference material.
R = relative rating on a basis of 100 per cent being the value of the reference material.

When the rating R is equal to the angle of bend (F) at start of failure, the following relationship exists from Equation 1:

(2) $$\frac{A}{B} = \frac{R}{100} = \frac{F}{100}$$

or (3) $$\frac{A}{F} = \frac{B}{100} (= 132 \text{ when Example 1 is the reference material})$$

The ratio of A/F is the average number of inch-pounds required per degree of bending and therefore it is only when the material tested has about 30 per cent higher strength compared to that of the reference material that the angle of bend at the start of failure can be equal to the weldability rating.

*Table II*

| Example No. | Max. load, lbs. | Angle at max. load, deg. | Load at failure or jig capacity, lbs. | Angle at failure or jig capacity, deg. | Type of failure | Energy absorbed, inch-lbs. | Relative rating (Example 1 Fig. 6=100%) |
|---|---|---|---|---|---|---|---|
| 7 | 4,300 | 66 | 1,900 | 129 | None | 9,800 | 74 |
| 8 | 4,300 | 66 | 3,300 | 107 | Abrupt-complete | 7,700 | 58 |
| 9 | 4,300 | 66 | 4,300 | 66 | ----do---- | 4,600 | 35 |
| 10 | 8,400 | 56 | 4,000 | 129 | None | 19,400 | 147 |
| 11 | 8,400 | 56 | 6,200 | 107 | Abrupt-complete | 15,300 | 116 |
| 12 | 8,400 | 56 | 8,400 | 56 | ----do---- | 7,200 | 55 |

Referring to Fig. 11, it will be seen therefrom that materials having equal maximum loads can have widely different ductility and energy absorbing capacities and therefore the use of the maximum load, by itself, is not a good criterion for weldability.

From Examples 11, 12, 13 and 14 of Fig. 11, it will be seen that the angle of bend at the start of failure is almost the same as the relative rating based upon energy absorption of a medium strength highly ductile material, such as is shown in Fig. 6, and from this it might be inferred that the angle of bend at the start of failure is just as satisfactory a criterion of weldability as the use of relative energy absorption. The relative rating number obtained from the absorbed energy depends upon both the strength and ductility of the tested and reference materials after welding.

The data for Examples 10 to 14 inclusive, Fig. 11 are given in the following table,

*Table III*

| Example No. | Max. load, lbs. | Angle at max. load, deg. | Load at failure or jig capacity, lbs. | Angle at failure or jig capacity, deg. | Type of failure | Energy absorbed, inch-lbs. | Relative rating (Example 1 Fig. 6=100%) |
|---|---|---|---|---|---|---|---|
| 10 | 8,400 | 56 | 4,000 | 129 | None | 19,400 | 147 |
| 11 | 8,400 | 56 | 6,200 | 107 | Abrupt-complete | 15,300 | 116 |
| 12 | 8,400 | 56 | 8,400 | 56 | ----do---- | 7,200 | 55 |
| 13 | 8,400 | 41 | 8,400 | 41 | ----do---- | 5,200 | 39 |
| 14 | 8,400 | 10 | 8,400 | 10 | ----do---- | 1,200 | 8 |

From Fig. 12 it will be seen that materials may have equal capacities to absorb energy while they may have widely different abilities to resist loads and deflections and the type of fracture may be entirely different. Each of the welded steels shown in Fig. 12 would be capable of sustaining a blow containing the same amount of energy. The designer's choice of which materials to use must be based upon other requirements of the specific application involved. The steel of Example 7 may be preferable for some applications and the steel of Example 17 for others. None of the other weldability criteria which are available are nearly as satisfactory as this one measurement, that is, the energy absorbed.

The data for Examples 7, 15, 16 and 17 of Fig. 12 are given below in Table IV:

Table IV

| Example No. | Max. load, lbs. | Angle at max. load, deg. | Load at failure or jig capacity, lbs. | Angle at failure or jig capacity, deg. | Type of failure | Energy absorbed, inch-lbs. | Relative rating (Example 1 Fig. 6=100%) |
|---|---|---|---|---|---|---|---|
| 7 | 4,300 | 66 | 1,900 | 129 | None | 9,800 | 74 |
| 15 | 6,600 | 54 | 3,700 | 90 | Abrupt-complete | 9,800 | 74 |
| 16 | 8,500 | 66 | 8,500 | 69 | ----do---- | 9,800 | 74 |
| 17 | 10,600 | 59 | 10,600 | 59 | ----do---- | 9,800 | 74 |

In all examples set forth in the drawings, Example 1, Fig. 6 was selected as the reference material for purposes of illustration. For the medium strength 129° bend limit shown, a material absorbing an average of 12,900 inch-pounds would provide a basic average of 100 inch-pounds per degree of bending. It can be seen from Equations 2 and 3 above that whenever the rating and the angle of bend at the start of failure are equal, the material tested has about 30% greater plastic strength than the reference material. To compare two materials of unequal properties on the basis of requiring equal angles of bend alone, therefore, is to ignore the ability of the stronger material to absorb a greater amount of energy up to the point of failure. In many cases this ability may prevent an actual failure from occurring. However, when the stronger material is very brittle, the energy rating system will also adequately provide a low rating to that material. For instance, the high strength material shown in Example 14, Fig. 11 properly received a very low rating. From these comparisons it can be seen that, except for those special applications wherein extreme abilities to deform while still retaining full fluid or gas tightness of the welded seams are required, the angle of bend at the start of failure is not by itself an adequate criterion for weldability.

It will be seen from Table V below that even very brittle materials (Example 14) may have a high energy absorption per degree of deformation sustained and therefore such a criterion is not proposed for use. Values for all of the illustrated diagrams are summarized in Table V below:

testing bead welded plates the centering slot of the crosshead 19 is not applicable, but all other details of testing are identical. The only necessary requirement is that the bottom of the crosshead must contact the upper surface of the bend specimen at some point before load is applied. Each type of specimen or each different set of proportions requires its own basis for comparison, but the method of determining energy of deformation is not changed.

I claim:

1. Apparatus for determining the weldability of metals, which comprises, in combination, a frame adapted to be attached to a platen of a testing machine operating in compression, a crosshead slidably mounted in the frame and adapted to move vertically in the frame under deforming pressures exerted on a welded specimen of metal received in the crosshead, means on the crosshead for receiving a portion of the welded specimen and for centering the specimen relative to the frame, spaced-apart deforming instrumentalities rigidly but removably mounted in the frame and adapted to be engaged by the specimen, a deforming mandrel mounted on an opposing platen of the testing machine and adapted to engage the welded specimen intermediate the said spaced-apart deforming instrumentalities and to deform the said specimen by forcing the specimen between the deforming instrumentalities responsively to compressional movement between the platens, the said means on the crosshead being positioned relative to the mandrel and deforming instrumentalities so that the deforming load is invariably applied on the center line of the welded Table V

| Example (refer Figs. 6 to 12) | Relative strength of base metal | Max. load resisted, lbs. | Energy absorbed to point of failure or jig capacity, in.-lbs. | Angle of bend at start of failure, degrees | Rating based upon energy absorbed | Average energy absorbed per degree of bending |
|---|---|---|---|---|---|---|
| 1 | Medium | 5,600 | 13,200 | [1] 129 | [2] 100 | 102 |
| 2 | ----do---- | 6,650 | 12,100 | 108 | 92 | 112 |
| 3 | Med.-high | 7,150 | 6,500 | 55 | 49 | 118 |
| 4 | Medium | 6,250 | 10,900 | 105 | 83 | 104 |
| 5 | ----do---- | 6,250 | 5,400 | 54 | 41 | 100 |
| 6 | Med.-low | 5,000 | 1,200 | 16 | 9 | 75 |
| 7 | Low | 4,300 | 9,800 | [1] 129 | 74 | 76 |
| 8 | ----do---- | 4,300 | 7,700 | 107 | 58 | 72 |
| 9 | ----do---- | 4,300 | 4,600 | 66 | 35 | 70 |
| 10 | High | 8,400 | 19,400 | [1] 129 | 147 | 150 |
| 11 | ----do---- | 8,400 | 15,300 | 107 | 116 | 143 |
| 12 | ----do---- | 8,400 | 7,200 | 56 | 55 | 128 |
| 13 | ----do---- | 8,400 | 5,200 | 41 | 39 | 127 |
| 14 | ----do---- | 8,400 | 1,200 | 10 | 8 | 120 |
| 15 | Medium | 6,600 | 9,800 | 90 | 74 | 109 |
| 16 | High | 8,500 | 9,800 | 69 | 74 | 142 |
| 17 | Very high | 10,600 | 9,800 | 59 | 74 | 166 |

[1] None.   [2] Base.

All of the above discussion has related to the application of the improved method to welded T-joint bend specimens. The method, however, can be applied to bead welded plating and to other joints of various proportions and shapes. For joint of the specimen, and a scale secured to the crosshead and extending horizontally therefrom, the said scale being graduated into values corresponding to the amounts of deforming forces applied to the specimen, the said cross head and scale being vertically movable responsively to deformation of the said specimen, the said movement being an indication of the amount of deflection of the specimen under deformation thereof, whereby the said deforming forces may be manually plotted against deflection, thereby producing an energy-absorption curve corresponding to amounts of energy absorbed by the specimen during deformation thereof until ultimate deformation of the specimen is reached, the said ultimate deformation occurring under application of increasing forces or under application of decreasing forces following application of a peak load, depending upon yield point properties of the specimen being tested.

2. Apparatus for determining the weldability of metals, which comprises, in combination, a frame adapted to be attached to a platen of a testing machine operating in compression, a crosshead slidably mounted in the said frame and adapted to move vertically in the said frame under deforming pressures exerted on a welded specimen of metal received in the said crosshead, spaced-apart deforming instrumentalities rigidly but removably mounted in the frame and adapted to be engaged by the specimen, means for applying deforming forces against the said specimen, means for indicating amounts of the said forces, a scale secured to the said crosshead and extending horizontally therefrom, the said scale being graduated into values corresponding to the amounts of deforming forces applied to the specimen, the said crosshead and scale being vertically movable responsively to deformation of the said specimen, the said movement being an indication of the amount of deflection of the specimen under deformation thereof, and a chart support located in a plane parallel to movement of the scale, and adjacent to the said scale, whereby the said deforming forces may be manually plotted against deflection during deformation of the specimen, thereby producing an energy-absorption curve corresponding to amounts of energy absorbed by the specimen during deformation thereof until ultimate deformation of the specimen is reached.

JULIUS HEUSCHKEL.